United States Patent
Ichii et al.

(10) Patent No.: US 10,628,059 B2
(45) Date of Patent: Apr. 21, 2020

(54) STORAGE SYSTEM, CONNECTION CONTROLLER, AND STORAGE CONTROL PROGRAM

(71) Applicant: FUJITSU LIMITED, Kawasaki-shi, Kanagawa (JP)

(72) Inventors: Sekai Ichii, Zushi (JP); Katsuya Niigata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 16/005,745

(22) Filed: Jun. 12, 2018

(65) Prior Publication Data
US 2018/0364930 A1 Dec. 20, 2018

(30) Foreign Application Priority Data
Jun. 16, 2017 (JP) .................. 2017-118311

(51) Int. Cl.
G06F 1/32 (2019.01)
G06F 1/26 (2006.01)
G06F 3/06 (2006.01)
G06F 1/3296 (2019.01)
G06F 1/3234 (2019.01)
G06F 13/40 (2006.01)

(52) U.S. Cl.
CPC .......... *G06F 3/0625* (2013.01); *G06F 1/3268* (2013.01); *G06F 1/3296* (2013.01); *G06F 3/067* (2013.01); *G06F 3/0634* (2013.01); *G06F 3/0653* (2013.01); *G06F 3/0683* (2013.01); *G06F 3/0635* (2013.01); *G06F 13/4022* (2013.01)

(58) Field of Classification Search
None
See application file for complete search history.

(56) References Cited

U.S. PATENT DOCUMENTS

| 7,730,235 B2 * | 6/2010 | Kumasawa | G06F 1/3221 710/36 |
| 9,578,362 B1 * | 2/2017 | Li | H04N 21/26283 |
| 2005/0228943 A1 * | 10/2005 | DeCenzo | G06F 11/1076 711/114 |
| 2011/0283116 A1 | 11/2011 | Ban | |
| 2012/0023292 A1 * | 1/2012 | Saito | G06F 1/3203 711/114 |

FOREIGN PATENT DOCUMENTS

| JP | 10-333796 | 12/1998 |
| JP | 2012-524928 | 10/2012 |

* cited by examiner

*Primary Examiner* — Nitin C Patel
(74) *Attorney, Agent, or Firm* — Fujitsu Patent Center

(57) ABSTRACT

A storage control program for causing a computer to perform a process comprising; determining a second number indicating a number of first storage devices in each of which a connection with a controller is established among the two or more first storage devices; and performing control such that a second storage devices, in each of which a connection with the controller is not established among the two or more first storage devices, are caused to transition to a power saving state in a time period in which the second number reaches a first number indicating a number of communication routes used when the controller accesses the two or more first storage devices.

11 Claims, 17 Drawing Sheets

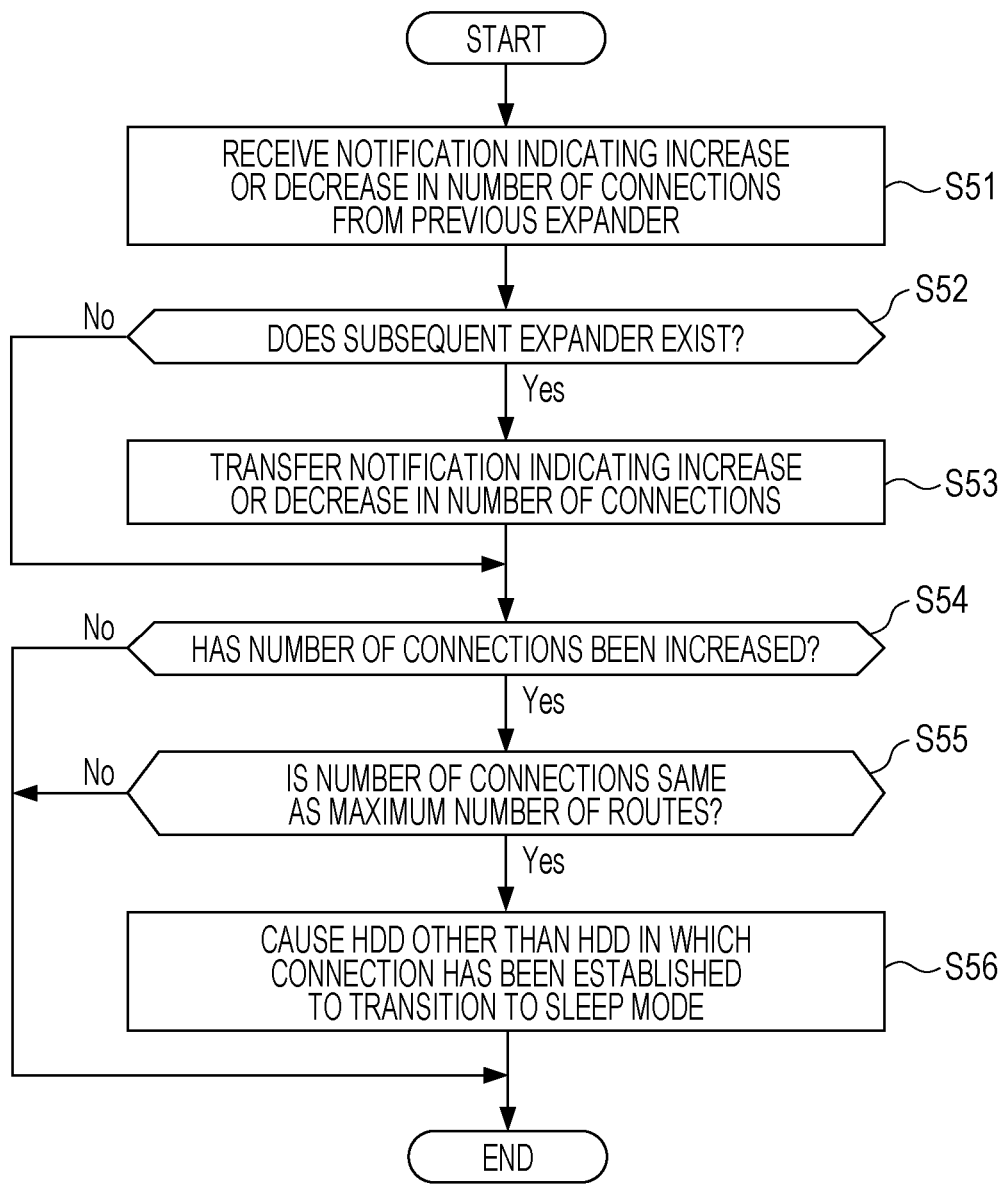

STORAGE SYSTEM, CONNECTION CONTROLLER, AND STORAGE CONTROL PROGRAM

CROSS-REFERENCE TO RELATED APPLICATION

This application is based upon and claims the benefit of priority of the prior Japanese Patent Application No. 2017-118311, filed on Jun. 16, 2017, the entire contents of which are incorporated herein by reference.

FIELD

The embodiments discussed herein are related to a storage system, a connection controller, and a storage control program.

BACKGROUND

Recently, with a demand of large capacity for a storage system, the number of storage devices installed in the storage system tends to increase. However, there is a problem that the power consumption also increases in the storage system, and therefore, a control technique for power saving has been desired. For example, power saving may be realized such that the installed storage devices are actively caused to transition to a power saving state. As an example of such power saving, a link power management (LPM) technique has been used in which an amount of data input/output into/from a storage device is monitored, and the storage device is caused to transition to a sleep state when an amount of input/output data has become zero.

In addition, a technique described below has been proposed for power saving. For example, a storage controller has been proposed in which supply of power to an unconnected port among two or more ports is stopped (see Japanese National Publication of International Patent Application No. 2012-524928). In addition, for example, it has been proposed that, in a disk device compatible with fibre channel arbitrated loop (FC-AL), an operation of a driver/receiver circuit included in an unused port among two or more ports is stopped (see Japanese Laid-open Patent Publication No. 10-333796).

In the above-described technique in which the storage device is caused to transition to the sleep state in the case where an amount of input/output data has become zero, when an input/output is newly requested for the storage device, the storage device is caused to be recovered from the sleep state. When an input/output is requested for the storage device in the sleep mode as described above, a response speed to the input/output request is reduced compared to the regular state. Thus, in the above-described technique, the power saving of the storage device is realized, but there is a problem in which the access performance of the storage device is reduced.

An object of an embodiment is to provide a storage system, a connection controller, and a storage control program in each of which the access performance is improved.

SUMMARY

According to an aspect of the invention, a storage control program for causing a computer to perform a process includes: determining a second number indicating a number of first storage devices in each of which a connection with a controller is established among the two or more first storage devices; and performing control such that a second storage devices, in each of which a connection with the controller is not established among the two or more first storage devices, are caused to transition to a power saving state in a time period in which the second number reaches a first number indicating a number of communication routes used when the controller accesses the two or more first storage devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a flowchart illustrating an example of sleep mode transition control processing.

DESCRIPTION OF EMBODIMENTS

Embodiments are described below with reference to drawings.

First Embodiment

Figure 1:
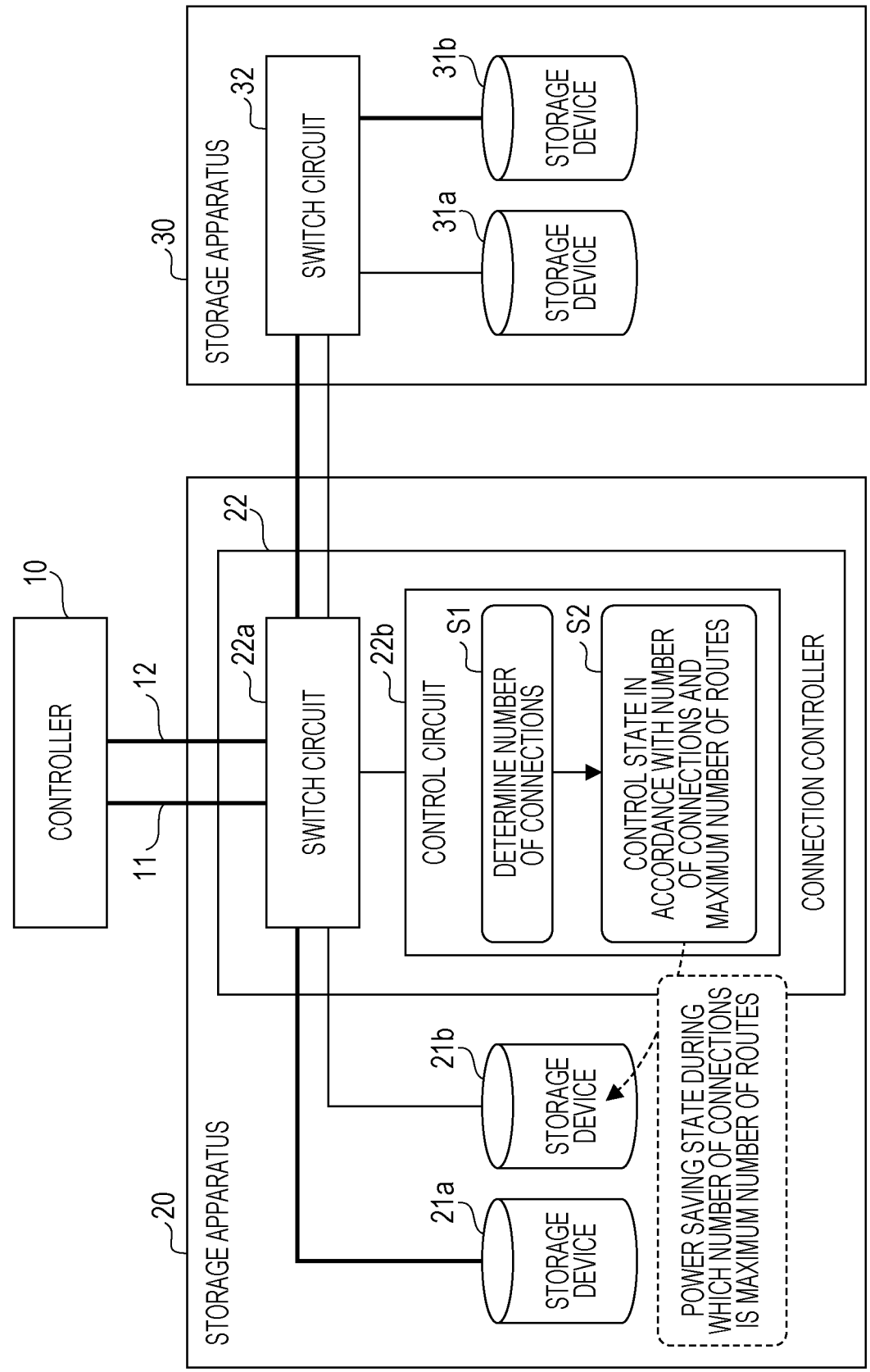
FIG. 1 is a diagram illustrating an exemplary configuration and exemplary processing of a storage system according to a first embodiment.

FIG. 1 is a diagram illustrating an exemplary configuration and exemplary processing of a storage system according to a first embodiment. The storage system illustrated in FIG. 1 includes a controller 10 and storage apparatuses 20 and 30.

The controller 10 accesses two or more storage devices. In FIG. 1, it is assumed that there are storage devices 21a, 21b, 31a, and 31b such as hard disk drives (HDDs) or solid state drives (SSDs) as storage devices that are targets accessed by the controller 10. In addition, in the following description, the storage devices 21a, 21b, 31a, and 31b that are the targets accessed by the controller 10 are collectively referred to as "storage device group".

The storage apparatus 20 includes the storage devices 21a and 21b of the storage device group and a connection controller 22. The connection controller 22 includes a switch circuit 22a and a control circuit 22b.

The switch circuit 22a relays a communication between the controller 10 and the storage device group. Thus, the switch circuit 22a is included in any route used when the controller 10 accesses any storage device included in the storage device group.

For example, the controller 10 accesses the storage devices 21a and 21b via the switch circuit 22a. In addition, in FIG. 1, as an example, the storage apparatus 30 including a switch circuit 32 and the remaining storage devices 31a and 31b in the storage device group is coupled to the storage apparatus 20, and the switch circuit 22a is coupled to the switch circuit 32. In this case, the controller 10 accesses the storage devices 31a and 31b via the switch circuits 22a and 32.

Here, the controller 10 and the connection controller 22 are coupled to each other via two or more communication routes. In the embodiment, as an example, the controller 10 and the connection controller 22 are coupled to each other via two communication routes 11 and 12. Hereinafter, the number of communication routes 11 and 12 between the controller 10 and the connection controller 22 is referred to as "maximum number of routes". In the example of FIG. 1, the maximum number of routes is "2".

When the controller 10 accesses a storage device included in the storage device group, first, the controller 10 establishes a connection with the storage device. The connection is established in each of the communication routes 11 and 12, and the communication routes 11 and 12 in each of which the connection has been established are occupied. Therefore, the maximum number of storage devices that the controller 10 is allowed to access at the same time becomes the same as the maximum number of routes "2".

The control circuit 22b executes the state control processing of the storage devices 21a and 21b described below.

The control circuit 22b determines "number of connections" indicating the number of storage devices included in the storage device group, with each of which the controller 10 has established a connection (Step S1). For example, the control circuit 22b monitors a connection establishment request transmitted from the controller 10 and determines the number of connections in accordance with the monitoring result. In addition, in a time period in which the number of determined connections becomes the same as the maximum number of routes "2", the control circuit 22b controls the storage device 21b in which a connection with the controller 10 is not established among the storage devices 21a and 21b to transition to the power saving state (Step S2).

For example, it is assumed that a connection has been established between the controller 10 and the storage device 21a via the communication route 11. In this case, the number of connections is "1", which is smaller than the maximum number of routes "2". In such a state, the controller 10 may establish a new connection with another storage device included in the storage device group. Therefore, for example, the storage device 21b that has been caused to transition to the power saving state by the control of the control circuit 22b may be accessed from the controller 10. In this case, the storage device 21b performs reading/writing operation of data after having been released from the power saving state, such that a response time for the access is prolonged.

For example, it is assumed that a connection is established between the controller 10 and the storage device 21a via the communication route 11, and a connection is established between the controller 10 and the storage device 31b via the communication route 12. FIG. 1 illustrates such a state, and routes in each of which a connection has been established are indicated by thick lines.

In this case, the number of connections is "2", which is the same as the maximum number of routes "2". In such a state, the controller 10 is not allowed to establish a new connection with another storage device included in the storage device group. Therefore, in a time period in which such a state is maintained, the controller 10 does not access the storage device 21b or 31a. Therefore, as described above, the control circuit 22b controls the storage device 21b to transition to the power saving state in the time period in which the number of connections "2" is the same as the maximum number of routes "2".

As described above, in a time period in which it is guaranteed that a storage device coupled to the control circuit 22b is not accessed from the controller 10, the control circuit 22b causes the storage device to transition to the power saving state. Typically, when a storage device in the power saving state has been accessed from the controller 10, the storage device performs reading/writing operation of data after having been released from the power saving state, and therefore a response time for the access is prolonged compared to the regular state which is not the power saving state. However, in the above-described processing by the control circuit 22b, an access of the controller 10 to a storage device in the power saving state does not occur. Therefore, the access performance when the controller 10 accesses the storage device 21a or 21b included in the storage apparatus 20 is improved.

That is, in the first embodiment, the access performance of the storage device group may be improved while the power consumption of the storage device group is reduced.

Second Embodiment

Figure 2:
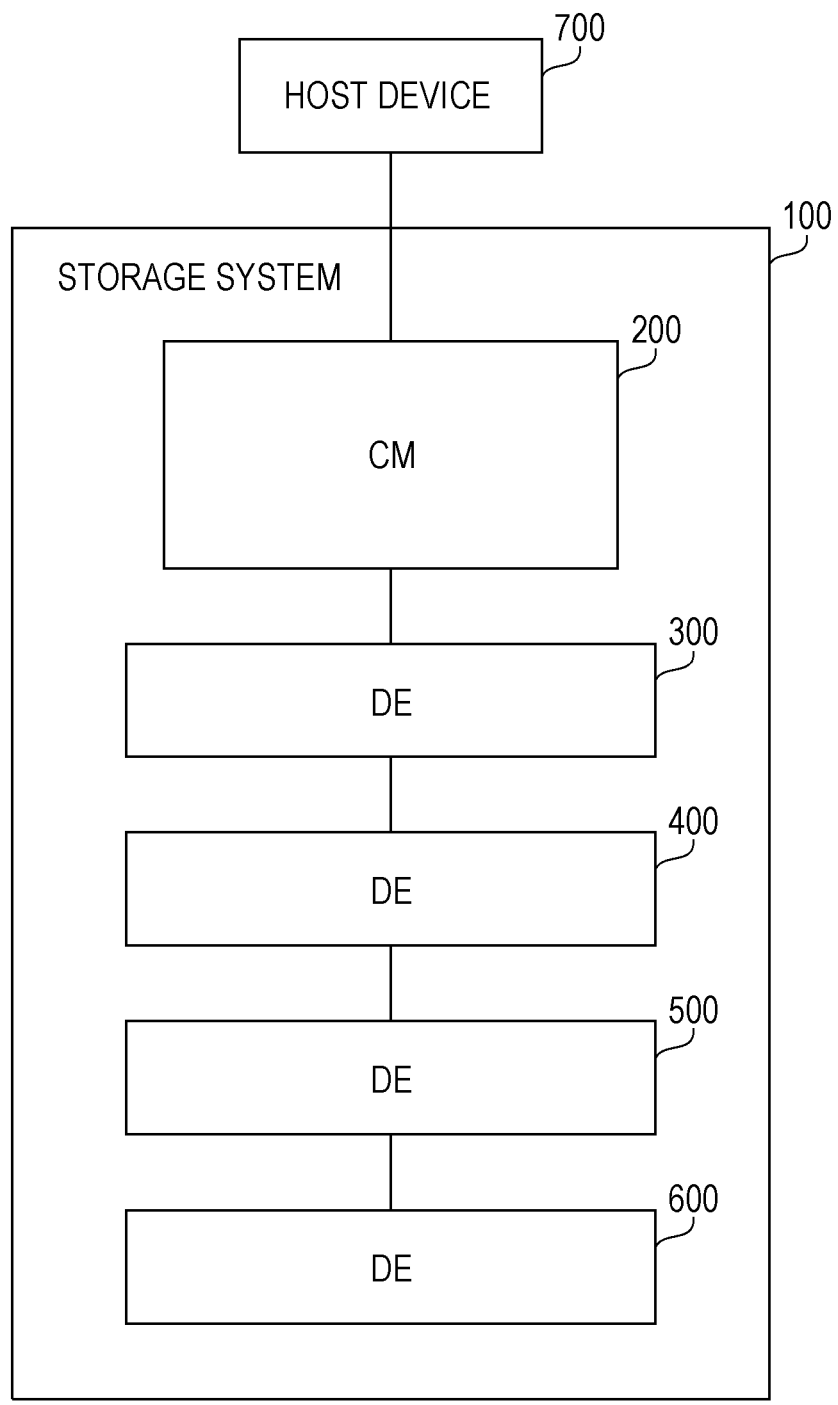
FIG. 2 is a diagram illustrating an exemplary configuration of a storage system according to a second embodiment.

FIG. 2 is a diagram illustrating an exemplary configuration of a storage system according to a second embodiment. A storage system 100 illustrated in FIG. 2 includes a controller module (CM) 200 and drive enclosures (DE) 300, 400, 500, and 600. In each of the DEs 300, 400, 500, and 600, two or more non-volatile storage devices such as HDDs or SSDs are installed. In addition, the DEs 300, 400, 500, and 600 are coupled to the CM 200 in series, in this order. The number of DEs included in the storage system 100 may be a certain number which is two or more, instead of four illustrated in FIG. 2.

A host device 700 is coupled to the CM 200. The CM 200 is a storage controller that accesses to each of the storage devices installed in the DEs 300, 400, 500, and 600 in response to a request from the host device 700. The storage system 100 and the host device 700 are coupled to each other, for example, via a storage area network (SAN) using a FC, an internet small computer system interface (iSCSI), or the like.

Figure 3:
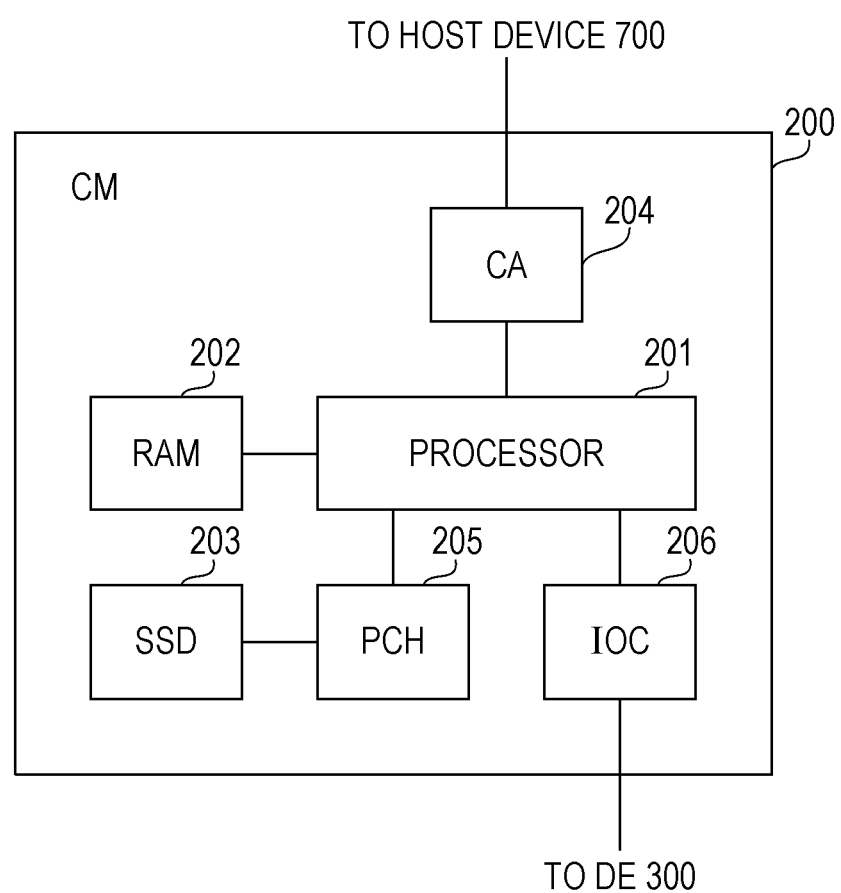
FIG. 3 is a diagram illustrating an exemplary configuration of hardware of a controller module (CM)

FIG. 3 is a diagram illustrating an exemplary configuration of hardware of the CM. The CM 200 includes a processor 201, a random access memory (RAM) 202, an SSD 203, a channel adapter (CA) 204, a platform controller hub (PCH) 205, and an input output controller (IOC) 206.

The processor 201 controls information processing of the CM 200. The processor 201 is, for example, one of a central processing unit (CPU), a micro processing unit (MPU), a digital signal processor (DSP), an application specific integrated circuit (ASIC), a graphics processing unit (GPU), and a programmable logic device (PLD). In addition, the processor 201 may be a combination of two or more elements among a CPU, an MPU, a DSP, an ASIC, a GPU, and a PLD.

The RAM 202 is a main memory of the CM 200. The RAM 202 temporarily stores some of a program of an operating system (OS) and application programs executed by the processor 201. In addition, the RAM 202 stores various data used for processing by the processor 201.

The SSD 203 is an auxiliary storage device of the CM 200. In the SSD 203, the program of the OS, the application programs, and the various data are stored. The CM 200 may include a HDD as an auxiliary storage device instead of the SSD 203.

The CA 204 is an interface used to communicate with the host device 700. Through the PCH 205, data is transmitted and received between the processor 201 and the SSD 203. Through the IOC 206, data is transmitted and received between the processor 201 and each of the storage devices in the DEs 300, 400, 500, and 600. In the embodiment, as an example, the IOC 206 is a serial attached small computer system interface (SCSI) (SAS) interface that operates as an SAS initiator.

Incidentally, the control circuit 22b in FIG. 1 may also have a similar structure as the CM 200 in FIG. 3.

Figure 4:
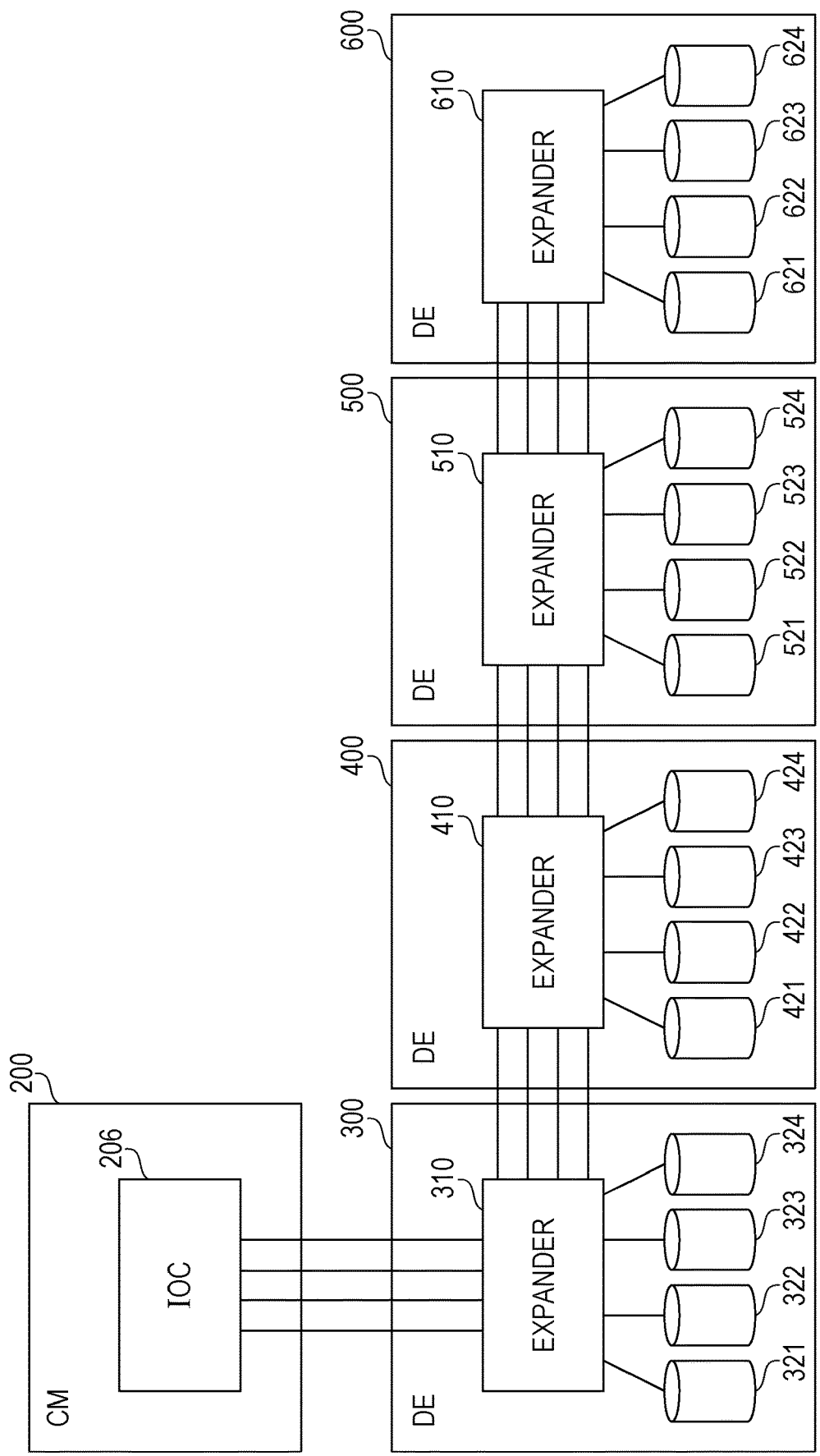
FIG. 4 is a diagram illustrating an exemplary internal configuration of drive enclosures (DEs)

FIG. 4 is a diagram illustrating an exemplary internal configuration of the DEs. In FIG. 4, connection states between the CM 200, and the DEs 300, 400, 500, and 600 are illustrated. In addition, in the embodiment, it is assumed that four HDDs are installed as storage devices in each of the DEs 300, 400, 500, and 600.

The DE 300 includes an expander 310 and HDDs 321 to 324. The DE 400 includes an expander 410 and HDDs 421 to 424. The DE 500 includes an expander 510 and HDDs 521 to 524. The DE 600 includes an expander 610 and HDDs 621 to 624.

Each of the expanders 310, 410, 510, and 610 is an SAS expander that relays data transmitted and received between the IOC 206 that is the SAS initiator and the HDDs that are SAS devices. The expander 310 is coupled to the IOC 206, the HDDs 321 to 324, and the expander 410. The expander 410 is coupled to the expander 310, the HDDs 421 to 424, and the expander 510. The expander 510 is coupled to the expander 410, the HDDs 521 to 524, and the expander 610. The expander 610 is coupled to the expander 510 and the HDDs 621 to 624. As described above, the expanders 310, 410, 510, and 610 are coupled to the IOC 206 in series, in this order.

In the embodiment, as an example, the IOC 206 and the expander 310 are coupled to each other via four communication routes, the expander 310 and the expander 410 are coupled to each other via four communication routes, the expander 410 and the expander 510 are coupled to each other via four communication routes, and the expander 510 and the expander 610 are coupled to each other via four communication routes. In addition, it is assumed that the expander 310 and each of the HDDs 321 to 324 are coupled to each other via a single communication route, the expander 410 and each of the HDDs 421 to 424 are coupled to each other via a single communication route, the expander 510 and each of the HDDs 521 to 524 are coupled to each other via a single communication route, and the expander 610 and each of the HDDs 621 to 624 are coupled to each other via a single communication route.

Here, it is assumed that "communication route" indicates a serial transmission path including a transmission differential signal line pair and a reception differential signal line pair. However, in an SAS specification, communication may be performed by using "wide port" that is a virtual single transmission path obtained by combining two or more serial transmission paths. The above-described "communication route" may be such a wide port.

In addition, when the IOC 206 accesses a HDD, the IOC 206 establishes a connection with the HDD. The connection is established for each of the communication routes, and the IOC 206 performs communication so as to occupy the communication route in which a connection has been established. In the embodiment, the four communication routes are coupled to the IOC 206, such that the IOC 206 may establish connections with four HDDs at the most and transmit and receive data to and from the HDDs in parallel.

Figure 5:
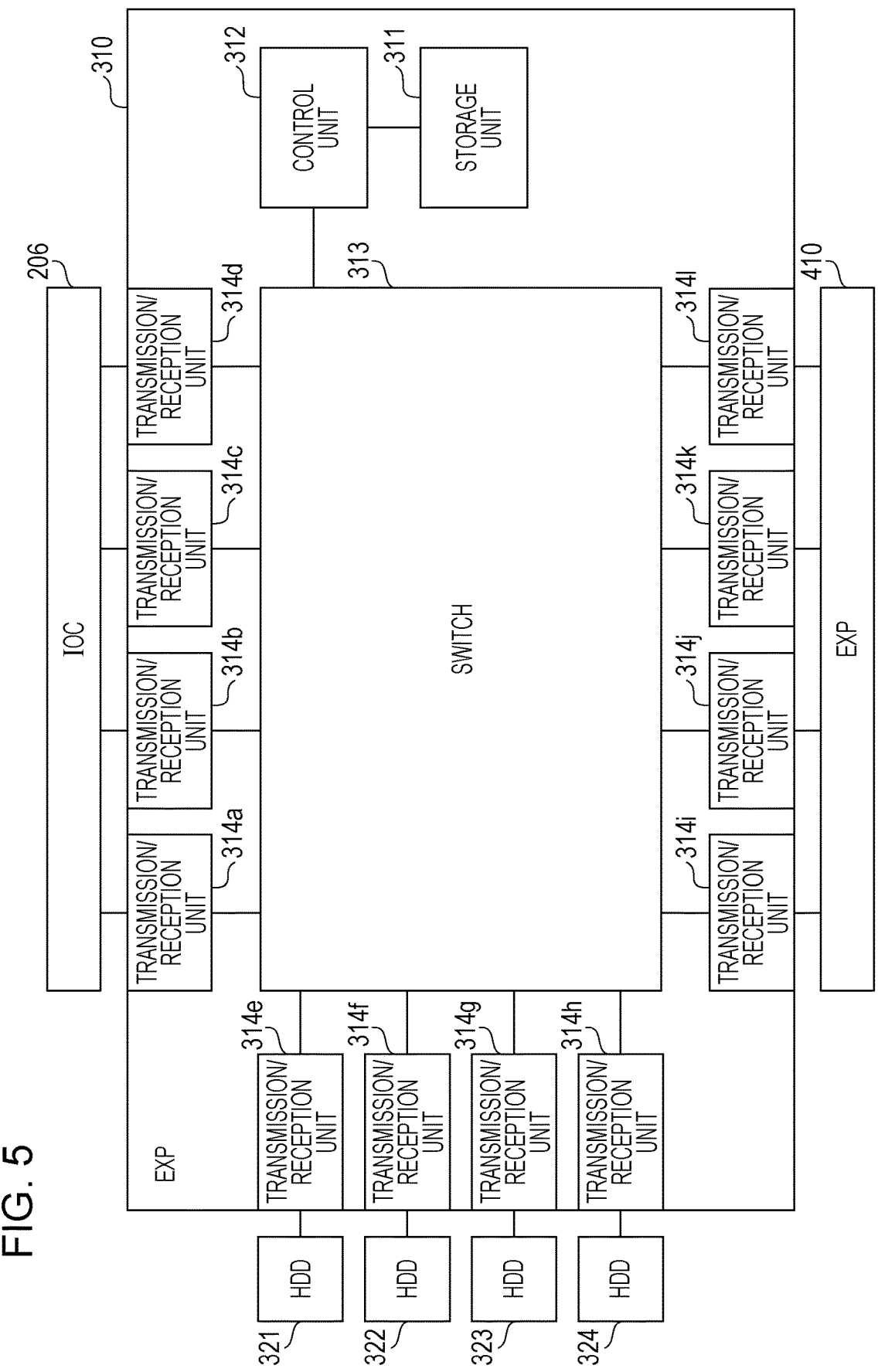
FIG. 5 is a diagram illustrating an exemplary configuration of hardware of an expander.

FIG. 5 is a diagram illustrating an exemplary configuration of hardware of the expander. In FIG. 5, as an example, a hardware configuration of the expander 310 is illustrated.

The expander 310 includes a storage unit 311, a control unit 312, a switch 313, and transmission/reception unit 314a to 314l. The storage unit 311 stores various data used for processing of the control unit 312. The control unit 312 is, for example, a processor. In this case, the control unit 312 executes various pieces of processing by executing a firmware program stored in the storage unit 311.

The control unit 312 controls connection of a route between the transmission/reception units by the switch 313. In addition, the control unit 312 includes a function to transmit information to the adjacent expander 410 and a function to cause the HDDs 321 to 324 coupled to the expander 310 to transition to the sleep mode and cause the HDDs 321 to 324 to be recovered from the sleep mode.

The switch 313 connects a route between one of the transmission/reception units 314a to 314l and another of the transmission/reception units 314a to 314l under the control of the control unit 312. The transmission/reception unit 314a to 314d communicate with the IOC 206 via respective communication routes. The transmission/reception units 314e to 314h respectively communicate with the HDDs 321 to 324 via communication routes. The transmission/reception units 314i to 314l communicate with the expander 410 via respective communication routes.

Each of the expanders 410, 510, and 610 respectively included in the DEs 400, 500, and 600 is also realized by hardware similar to that of the expander 310.

Information stored in each of the respective storage units of the DEs 300, 400, 500, and 600 is described below.

Figure 6:
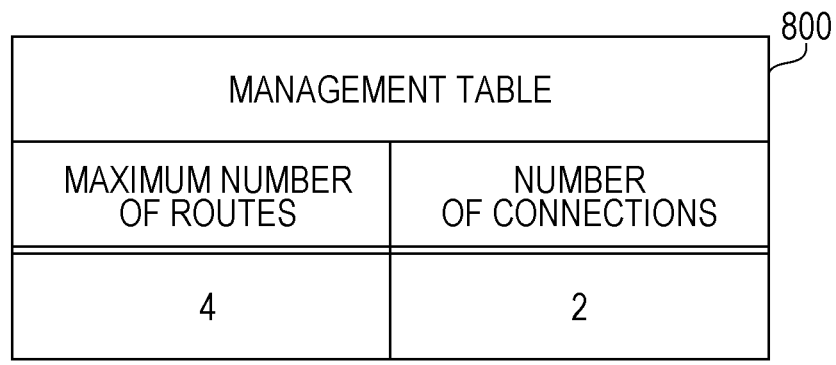
FIG. 6 is a diagram illustrating an example of a management table.

FIG. 6 is a diagram illustrating an example of a management table. A management table 800 is stored in each of the respective storage units of the DEs 300, 400, 500, and 600. The management table 800 includes items of the maximum number of routes and the number of connections. The item of the maximum number of routes indicates the maximum number of communication routes allowed to be used when the IOC 206 communicates with HDDs. In the example of FIG. 4, the maximum number of routes is "4". The item of the number of connections indicates the total number of connections each of which has been established between the IOC 206 and a HDD.

As described above, the IOC 206 performs communication so as to occupy a communication route in which a connection has been established. In the embodiment, by using such a feature, each of the expanders controls a HDD coupled to the expander to transition to the sleep mode or to be recovered from the sleep mode in accordance with the comparison result of the number of established connections and the maximum number of routes.

Specifically, each of the expanders causes a HDD in which a connection is not established among the HDDs coupled to the expander to transition to the sleep mode when the number of established connections reaches the maximum number of routes. In such a state, a connection is not established any more, and thus a HDD in which a connection is not currently established is not accessed from the IOC 206. In addition, each of the expanders causes a HDD in the sleep mode among the HDD coupled to the expander to be recovered from the sleep mode when the number of established connections becomes smaller than the maximum number of routes. In such a state, the IOC 206 may establish a new connection with a HDD in which a connection is not currently established. Therefore, a high-speed response may be realized even when any HDD is accessed from the IOC 206 because the HDD is not caused to be in the sleep mode.

In order to realize such control, each of the expanders 310, 410, 510, and 610 stores the management table 800 illustrated in FIG. 6 and stores the number of established connections and the maximum number of routes in the management table 800. Processing of obtaining the maximum number of routes by each of the expanders 310, 410, 510, and 610 is described below with reference to FIG. 7.

Figure 7:
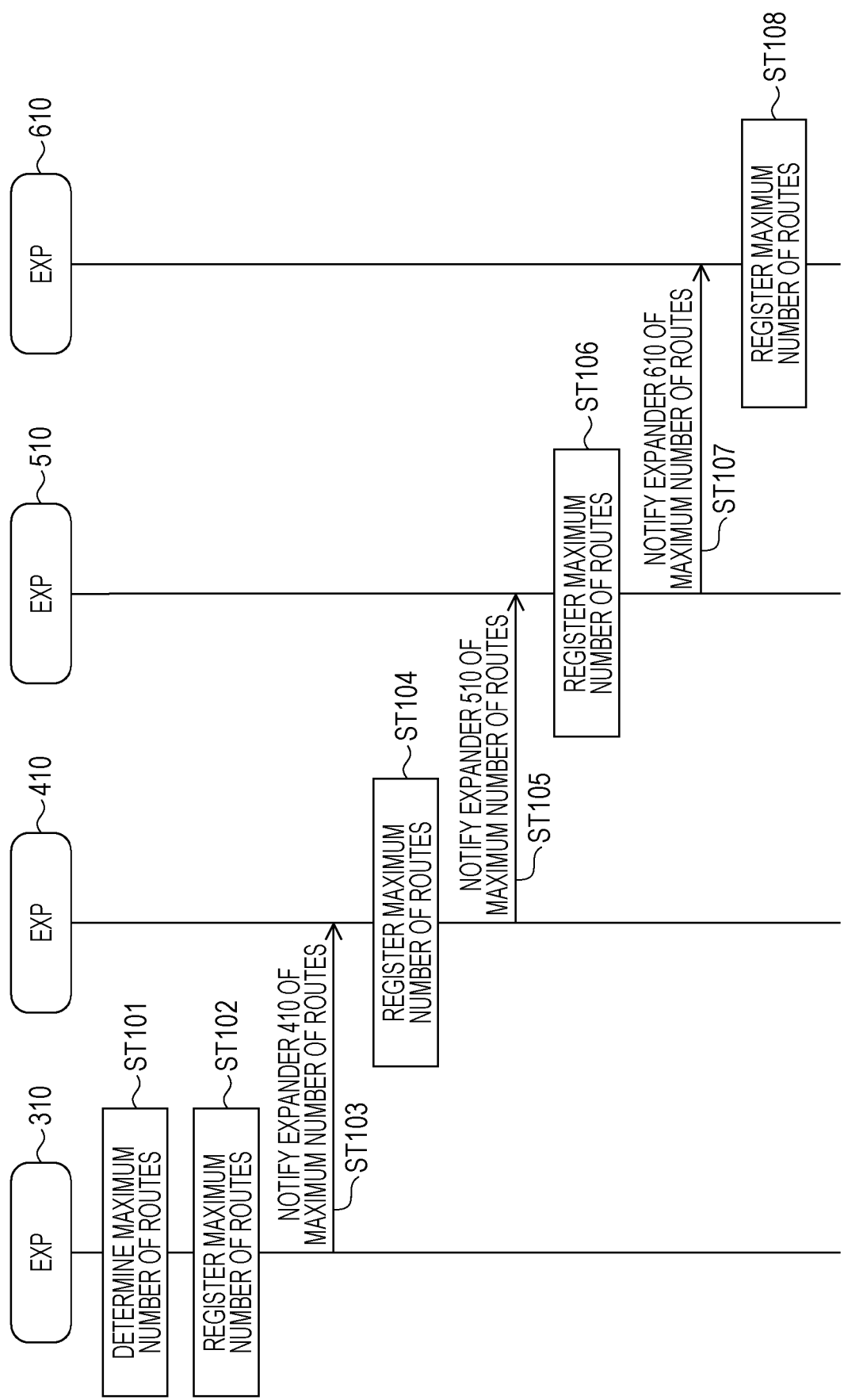
FIG. 7 is a sequence diagram illustrating an example of processing of obtaining the maximum number of routes.

FIG. 7 is a sequence diagram illustrating an example of processing of obtaining the maximum number of routes. The processing of FIG. 7 starts when power is supplied to the DEs 300, 400, 500, and 600 to start the DEs 300, 400, 500, and 600.

(ST101) The control unit 312 of the expander 310 determines the maximum number of routes. Specifically, the control unit 312 of the expander 310 recognizes devices coupled to the expander 310 and determines the number of communication routes coupled to the IOC 206 that is the SAS initiator to be the maximum number of routes.

(ST102) The control unit 312 of the expander 310 registers the maximum number of routes in the management table 800 stored in the storage unit 311 of the expander 310.

(ST103) The control unit 312 of the expander 310 notifies the adjacent expander 410 of the maximum number of routes. For example, 4 byte-data referred to as a "primitive" may be transmitted and received between the expanders. Therefore, in the embodiment, "BROADCAST (max)", which is a primitive, is prepared to broadcast the maximum number of routes to the other expanders. The control unit 312 of the expander 310 transmits, to the expander 410, a BROADCAST (max) primitive to which the maximum number of routes has been set.

(ST104) The control unit of the expander 410 receives the maximum number of routes, which has been notified by the expander 310, and registers the maximum number of routes in the management table 800 stored in the storage unit of the expander 410.

(ST105) The control unit of the expander 410 notifies the adjacent expander 510 of the maximum number of routes by transferring the received BROADCAST (max) primitive to the expander 510.

(ST106) The control unit of the expander 510 receives the maximum number of routes, which has been notified by the expander 410, and registers the maximum number of routes in the management table 800 stored in the storage unit of the expander 510.

(ST107) The control unit of the expander 510 notifies the adjacent expander 610 of the maximum number of routes by transferring the received BROADCAST (max) primitive to the expander 610.

(ST108) The control unit of the expander 610 receives the maximum number of routes, which has been notified by the expander 510, and registers the maximum number of routes in the management table 800 stored in the storage unit of the expander 610.

As described above, the maximum number of routes is determined by the expander 310 at the first stage, which is the first expander directly coupled to the IOC 206, and notifies the other expanders 410, 510, and 610 of the maximum number of routes by transferring the maximum number of routes to the other expanders 410, 510, and 610.

In addition, the number of established connections is obtained in the procedure described below. The first expander 310 monitors a connection establishment request and a connection disconnection request from the IOC 206 and detects an increase or a decrease in the number of established connections. In addition, the first expander 310 transmits a notification indicating an increase or a decrease in the number of connections to the adjacent expander 410. The notification indicating an increase or a decrease in the number of connections is transferred to the expanders 410, 510, and 610 in this order.

In the embodiment, primitives such as "BROADCAST (+)" and "BROADCAST (−)" respectively used to broadcast notifications indicating an increase and a decrease of the number of connections to the other expanders are prepared. In addition, the BROADCAST (+) primitive or the BROADCAST (−) primitive is transferred from the first expander 310 to the expanders 410, 510, and 610 in this order.

Processing executed in the expanders 310, 410, 510, and 610 after the respective DEs 300, 400, 500, and 600 have started are described below.

Figure 8:
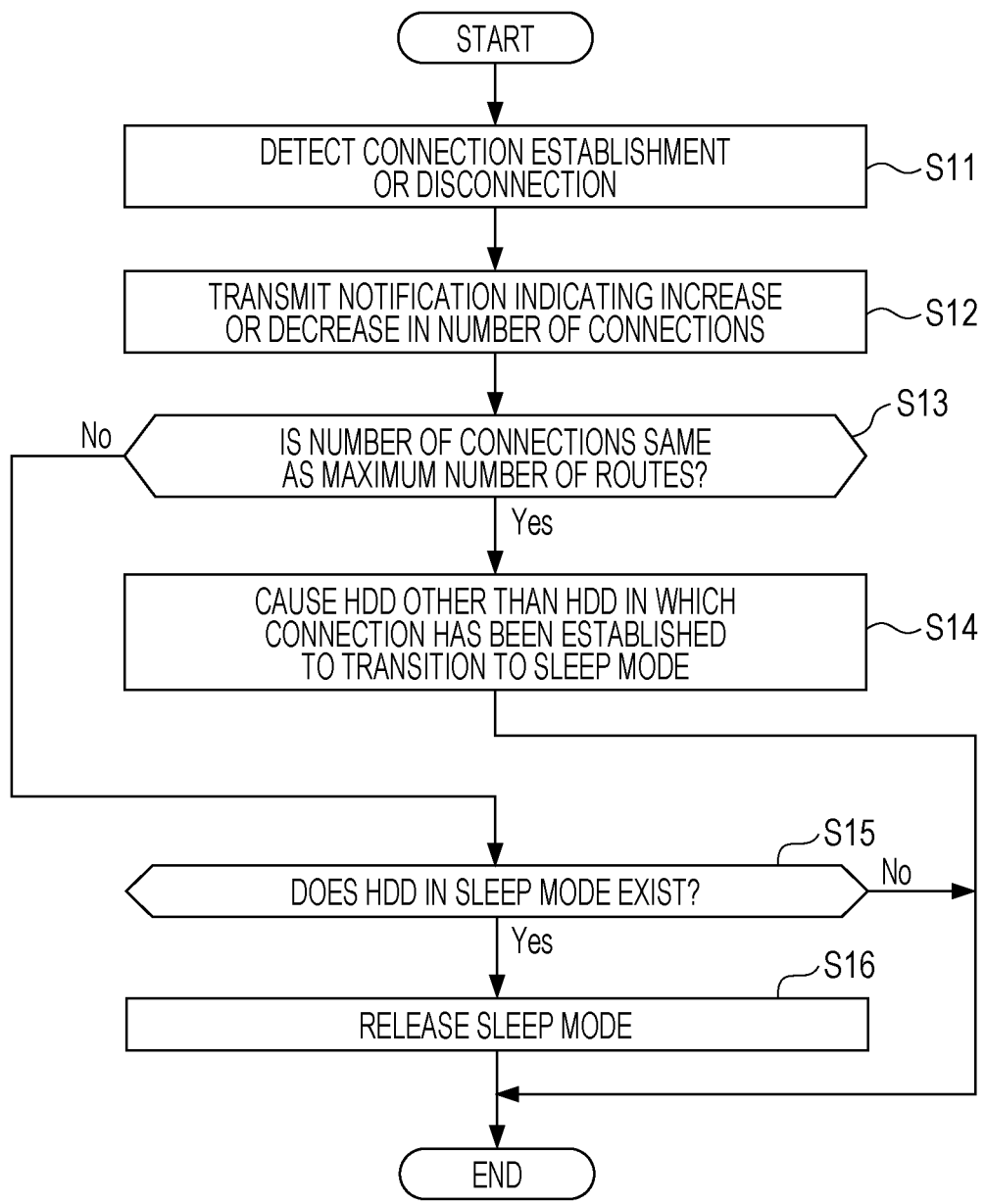
FIG. 8 is a flowchart illustrating an example of power saving control processing in a first expander.

FIG. 8 is a flowchart illustrating an example of power saving control processing in the first expander. That is, the processing of FIG. 8 is executed by the first expander 310. The processing illustrated in FIG. 8 is described below with reference to step numbers.

(S11) The control unit 312 of the expander 310 detects connection establishment or disconnection between the IOC 206 and a HDD.

When the IOC 206 communicates with the HDD, first, the IOC 206 transmits, to the HDD, an OPEN message used to request connection establishment. When the HDD that has received the OPEN message sends back an OPEN_ACCEPT message indicating acceptance of the request to the IOC 206, a connection between the IOC 206 and the HDD is established. Thus, for example, the control unit 312 monitors an OPEN message from the IOC 206, and detects that a new connection has been established when the HDD has sent back the OPEN_ACCEPT message to the IOC 206 as the response after the IOC 206 had transmitted the OPEN message to the HDD.

In addition, when the IOC 206 disconnects the connection, the IOC 206 transmits, to the HDD, a DONE message used to request the disconnection. Thus, for example, the control unit 312 monitors a DONE message from the IOC 206 and detects that the connection has been disconnected when the HDD had received the DONE message. Alternatively, the control unit 312 may detect that the connection has been disconnected when the HDD has sent back a DONE message or a CLOSE message to the IOC 206 after the IOC 206 had transmitted a DONE message to the HDD.

When the control unit 312 has detected establishment of a connection, the control unit 312 adds "1" to the number of connections of the management table 800 stored in the storage unit 311. In addition, when the control unit 312 has detected disconnection of the connection, the control unit 312 subtracts "1" from the number of connections of the management table 800 stored in the storage unit 311.

(S12) The control unit 312 transmits a notification indicating an increase or a decrease in the number of connections to the adjacent expander 410. Specifically, when the control unit 312 has detected an increase in the number of connections, the control unit 312 transmits a BROADCAST (+) primitive to the expander 410. On the other hand, when the control unit 312 has detected a decrease in the number of connections, the control unit 312 transmits a BROADCAST (−) primitive to the expander 410.

(S13) The control unit 312 determines whether the number of connections is the same as the maximum number of routes with reference to the management table 800 stored in the storage unit 311. When the number of connections is the same as the maximum number of routes, the control unit 312 causes the processing to proceed to Step S14. When the number of connections is less than the maximum number of routes, the control unit 312 causes the processing to proceed to Step S15.

(S14) The control unit 312 causes all HDDs other than a HDD in which a connection has been established among the HDDs 321 to 324 in the DE 300 to transition to the sleep mode. In addition, the control unit 312 ends the processing.

(S15) The control unit 312 determines whether a HDD in the sleep mode exists in the DE 300. That is, the control unit 312 determines whether the processing in Step S14 has been already executed. When a HDD in the sleep mode exists in the DE 300, the control unit 312 causes the processing to proceed to Step S16. When a HDD in the sleep mode does not exist in the DE 300, the control unit 312 ends the processing.

(S16) The control unit 312 causes the HDD in the sleep mode to be released from the sleep mode. In addition, the control unit 312 ends the processing.

Figure 9:
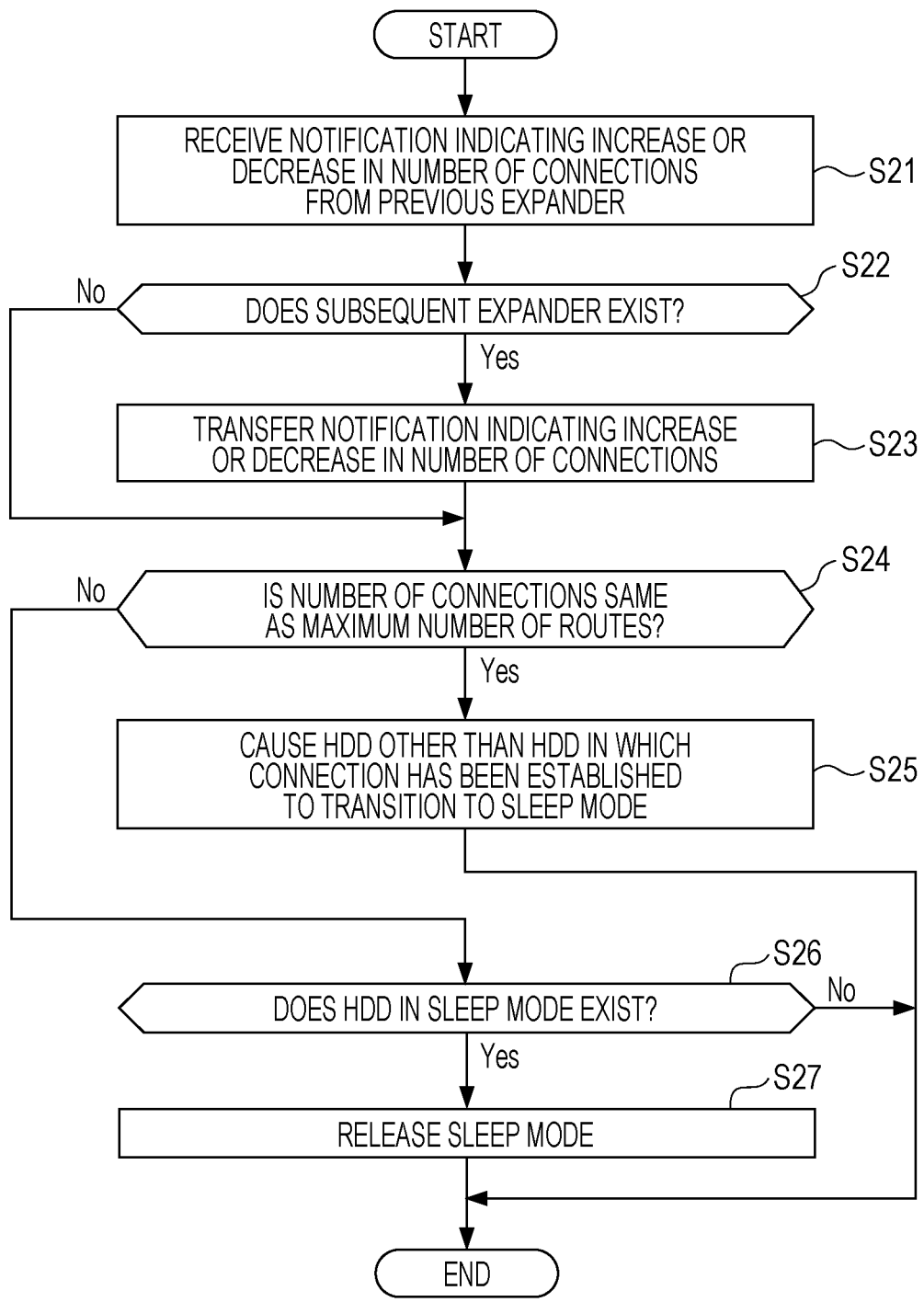
FIG. 9 is a flowchart illustrating an example of power saving control processing in second and subsequent expanders.

FIG. 9 is a flowchart illustrating an example of the power saving control processing in second or subsequent expanders. The processing of FIG. 9 is executed by each of the expanders 410, 510, and 610. The processing illustrated in FIG. 9 is described below with reference to step numbers.

(S21) The control unit of the expander receives a notification indicating an increase or a decrease in the number of connections from a previous expander. That is, the control unit receives a BROADCAST (+) primitive or a BROADCAST (−) primitive.

When the control unit has received a BROADCAST (+) primitive, the control unit adds "1" to the number of connections of the management table 800 stored in the storage unit of the expander including the control unit. In addition, when the control unit has received a BROADCAST (−) primitive, the control unit subtracts "1" from the number of connections of the management table 800.

(S22) The control unit determines whether a subsequent expander exists. For example, a subsequent expander when the processing of FIG. 9 is executed by the control unit of the expander 410 corresponds to the expander 510.

When a subsequent expander exists, the control unit causes the processing to proceed to Step S23. When a subsequent expander does not exist, the control unit causes the processing to proceed to Step S24.

(S23) The control unit transfers the notification indicating an increase or a decrease in the number of connections, which has been received in Step S21, to the subsequent expander.

(S24) The control unit determines whether the number of connections is the same as the maximum number of routes with reference to the management table 800 stored in the storage unit of the expander including the control unit. When the number of connections is the same as the maximum number of routes, the control unit causes the processing to proceed to Step S25. When the number of connections is smaller than the maximum number of routes, the control unit causes the processing to proceed to Step S26.

(S25) The control unit causes all HDDs other than a HDD in which a connection has been established among the HDDs coupled to the expander including the control unit to transition to the sleep mode. In addition, the control unit ends the processing.

(S26) The control unit determines whether a HDD in the sleep mode exists among the HDDs coupled to the expander including the control unit. When a HDD in the sleep mode exists, the control unit causes the processing to proceed to Step S27. When a HDD in the sleep mode does not exist, the control unit ends the processing.

(S27) The control unit causes the HDD in the sleep mode among the HDDs coupled to the expander including the control unit to be released from the sleep mode. In addition, the control unit ends the processing.

Figure 10:
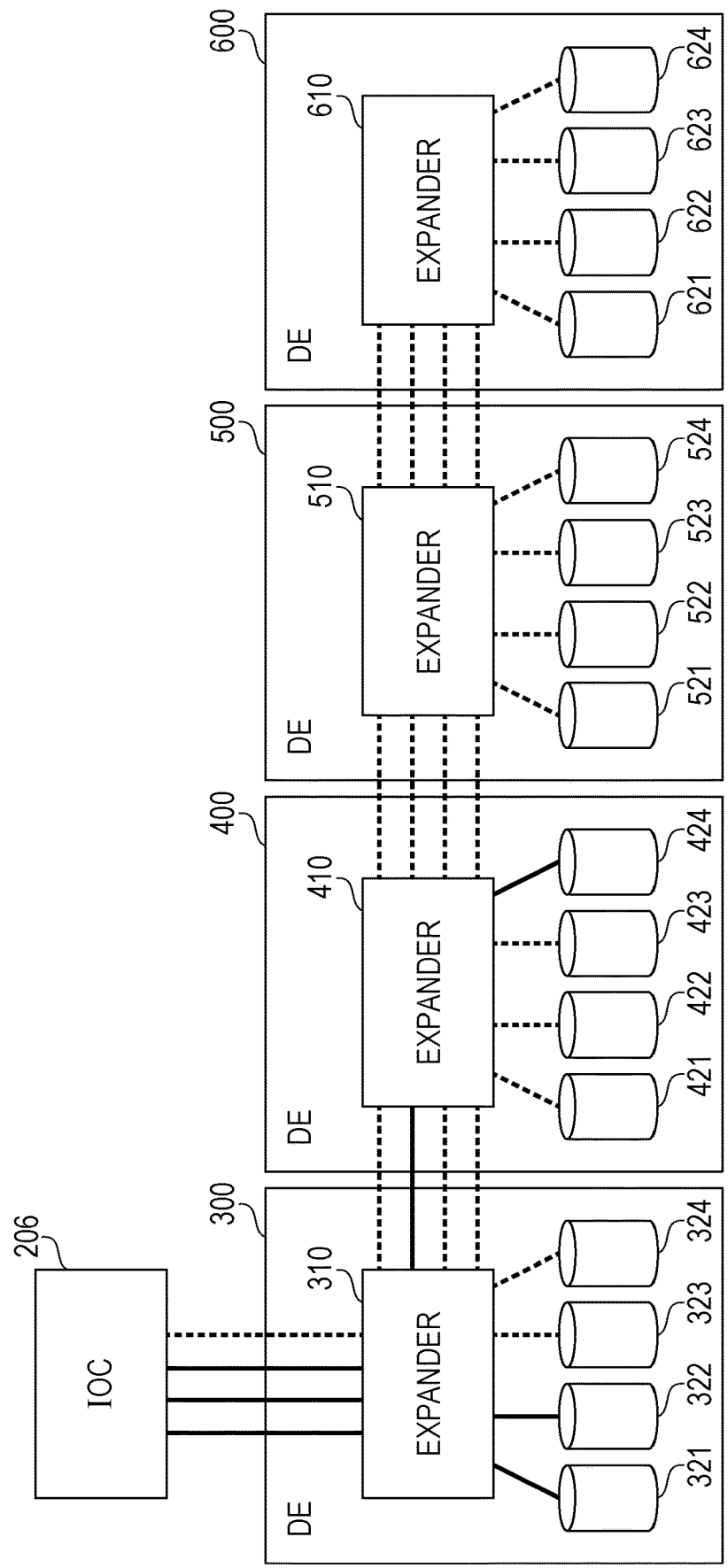
FIG. 10 is a first specific example of the power saving control processing in the second embodiment.
Figure 11:
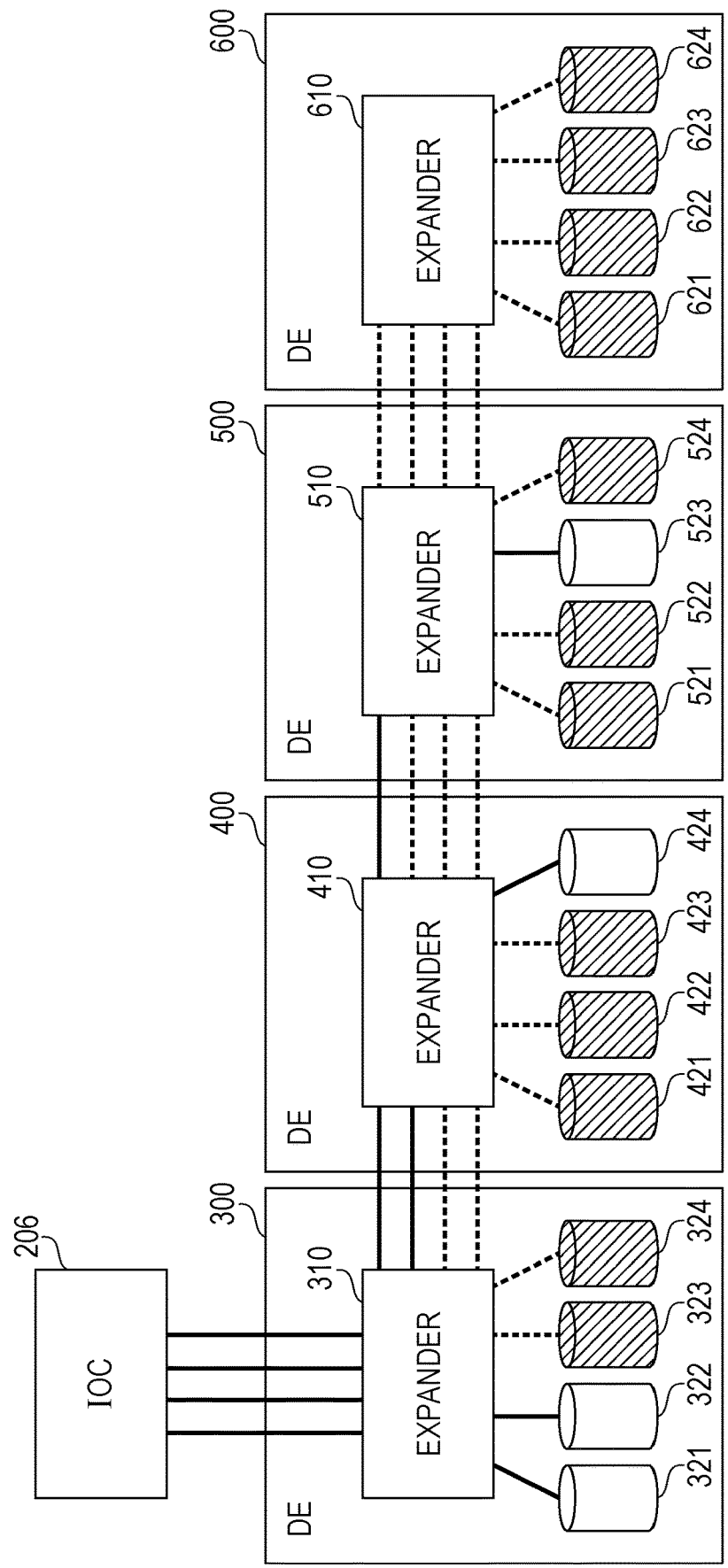
FIG. 11 is a second specific example of the power saving control processing in the second embodiment.
Figure 12:
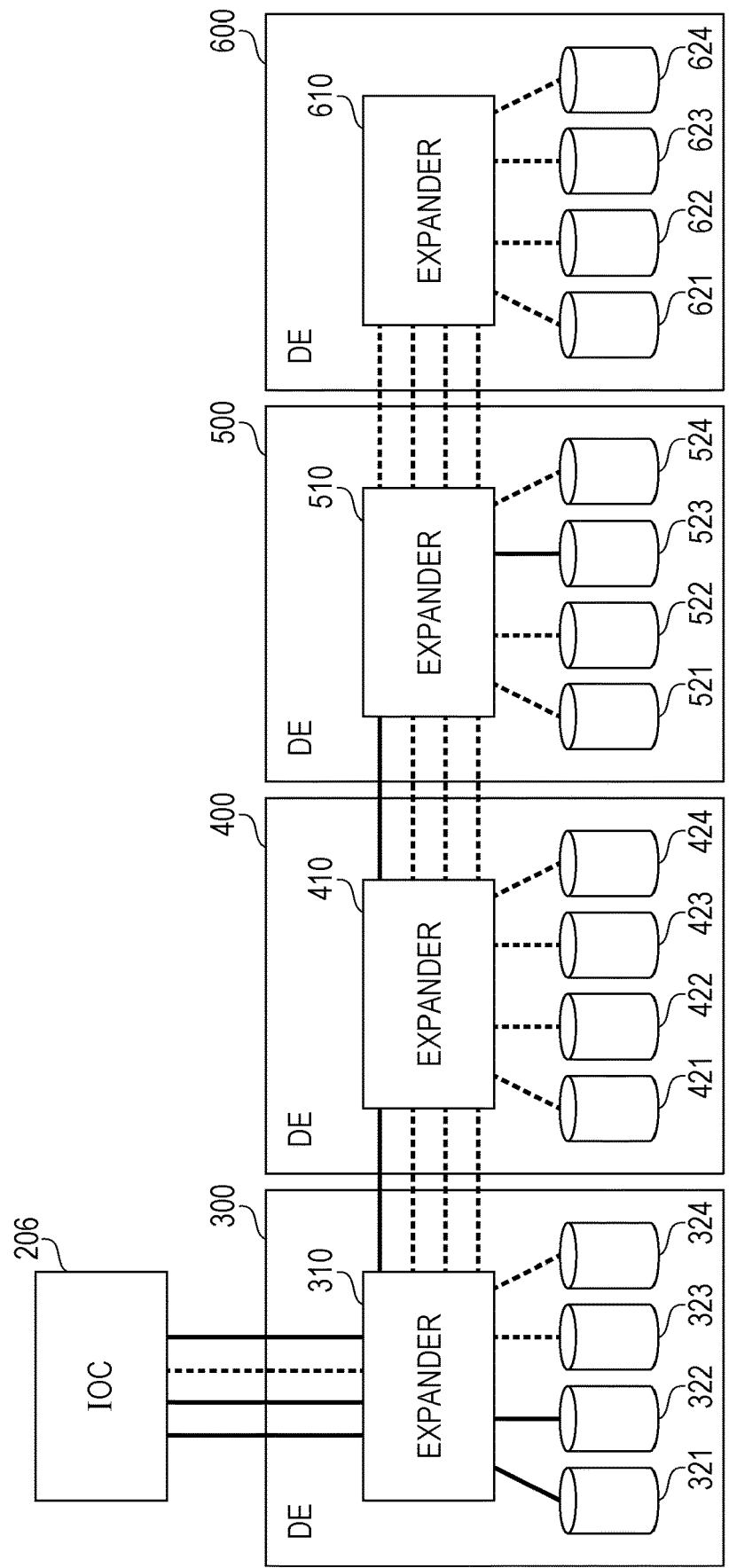
FIG. 12 is a third specific example of the power saving control processing in the second embodiment.

A specific example of the power saving control processing in the second embodiment is described below with reference to FIGS. 10 to 12. In FIGS. 10 to 12, a communication route in which a connection has been established is indicated by a solid line, and a communication route in which a connection is not established is indicated by a broken line. In addition, a HDD in the sleep mode is indicated by hatching.

FIG. 10 is a first specific example of the power saving control processing in the second embodiment. In FIG. 10, as an example, a connection is established between the IOC 206 and each of the HDDs 321, 322, and 424. In this case, the number of connections "3" is registered in the management table 800 stored in each of the expanders 310, 410, 510, and 610.

At this time, each of the expanders 310, 410, 510, and 610 determines that the number of connections "3" is smaller than the maximum number of routes "4". As described above, when the number of established connections is smaller than the maximum number of routes, any HDD in which a connection is not currently established may be accessed from the IOC 206 for new connection establishment. Here, in each of the expanders 310, 410, 510, and 610, any HDD coupled to the corresponding expander is not caused to transition to the sleep mode. That is, all of the HDDs 321 to 324, 421 to 424, 521 to 524, and 621 to 624 are controlled to become in the regular operation mode ("active mode"), which is not the sleep mode. As a result, even when any HDD in which a connection is not established is accessed from the IOC 206, the HDD may respond to the access in a short time without changing the operation mode.

FIG. 11 is a second specific example of the power saving control processing in the second embodiment. In FIG. 11, it is assumed that a connection has been newly established between the IOC 206 and the HDD 523 after the state in FIG. 10.

In this case, the first expander 310 detects that a connection has been established between the IOC 206 and the HDD 523 and notifies the expander 410 of an increase in the number of connections. Such a notification is transferred to the expanders 410, 510, and 610 in this order. As a result, in the management tables 800 stored in the respective expanders 310, 410, 510, and 610, the number of connections is updated from "3" to "4".

As a result, each of the expanders 310, 410, 510, and 610 determines that the number of connections "4" becomes the same as the maximum number of routes "4". When the number of established connections becomes the same as the maximum number of routes as described above, the IOC 206 is not allowed to establish a connection with another HDD any more. Therefore, any HDD in which a connection is not currently established is not accessed from the IOC 206. Thus, even when such HDDs are caused to transition to the sleep mode, a case does not occur in which one of the HDDs is accessed from the IOC 206, and a response is delayed by a release time from the sleep mode for the access.

From such a reason, the expander 310 causes the HDDs 323 and 324 in each of which the connection is not established among the HDDs 321 to 324 in the DE 300 to transition to the sleep mode. Similarly, the expander 410 causes the HDDs 421 to 423 in each of which the connection is not established among the HDDs 421 to 424 in the DE 400 to transition to the sleep mode. The expander 510 causes the HDDs 521, 522, and 524 in each of which the connection is not established among the HDDs 521 to 524 in the DE 500 to transition to the sleep mode. The expander 610 causes the HDDs 621 to 624 in each of which the connection is not established in the DE 600 to transition to the sleep mode.

FIG. 12 is a third specific example of the power saving control processing in the second embodiment. In FIG. 12, it is assumed that the connection between the IOC 206 and the HDD 424 is disconnected after the state illustrated in FIG. 11.

In this case, the first expander 310 detects the disconnection between the IOC 206 and the HDD 424 and notifies the expander 410 of a decrease in the number of connections. Such a notification is transferred to the expanders 410, 510, and 610 in this order. As a result, in the management tables 800 stored in the respective expanders 310, 410, 510, and 610, the number of connections is updated from "4" to "3".

As a result, each of the expanders 310, 410, 510, and 610 determines that the number of connections "3" is smaller than the maximum number of routes "4". In such a state, similar to the state in FIG. 11, any HDD in which a connection is not currently established may be accessed from the IOC 206 for new connection establishment. Therefore, each of the expanders 310, 410, 510, and 610 causes the HDDs in the sleep mode among the HDDs coupled to the expander to transition to the active mode. Specifically, the expander 310 causes the HDDs 323 and 324 to transition to the active mode. The expander 410 causes the HDDs 421 to 423 to transition to the active mode. The expander 510 causes the HDDs 521, 522, and 524 to transition to the active mode. The expander 610 causes the HDDs 621 to 624 to transition to the active mode.

In the above-described second embodiment, each HDD in which a connection is not established is controlled so as to become in the sleep mode only in a time period in which it is guaranteed that the HDD is not accessed from the IOC 206 due to a comparison of the number of established connections and the maximum number of routes. As a result, a case does not occur in which one of the HDDs in the sleep mode is not accessed, and a response time is prolonged because the HDD responds to the access after having been caused to transition to the active mode. Thus, as the whole storage system, the access performance may be improved while the power consumption is reduced.

Third Embodiment

A third embodiment is described below. Power saving control processing in the third embodiment is obtained by modifying a part of the above-described power saving control processing in the second embodiment. Therefore, a difference from the second embodiment is mainly described, and a duplicated description is omitted herein. A configuration of a storage system according to the third embodiment is the same as the storage system according to the second embodiment.

Figure 13:
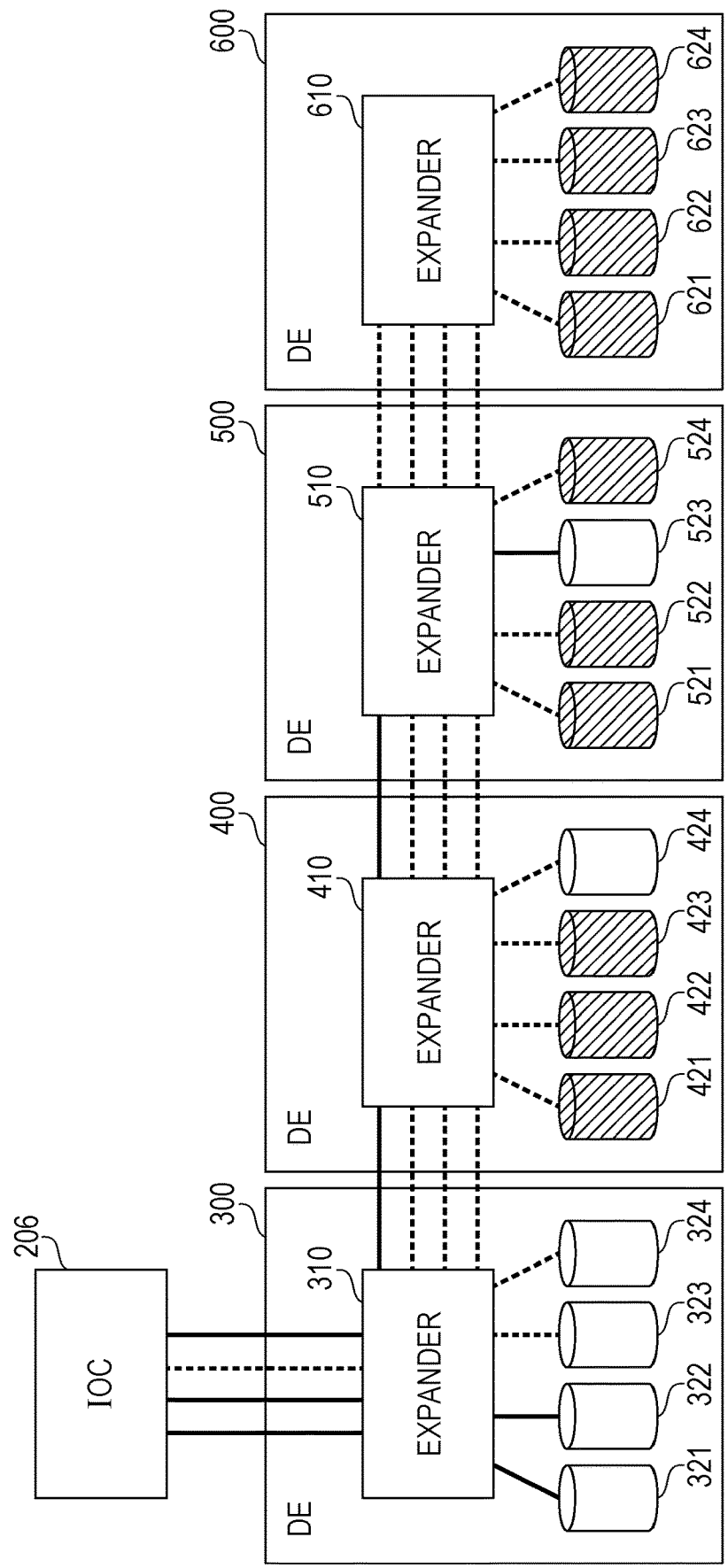
FIG. 13 is a first specific example of power saving control processing in a third embodiment.

FIG. 13 is a first specific example of the power saving control processing in the third embodiment. In FIG. 13, it is assumed that the connection between the IOC 206 and the HDD 424 is disconnected after the state illustrated in FIG. 11.

In the second embodiment, in this case, as illustrated in FIG. 12, all of the HDDs are controlled so as to become in the active mode. On the other hand, in the third embodiment, only the first expander 310 operates similar to that of the second embodiment, but each of the expanders 410, 510, and 610 that are the second and subsequent expanders do not cause the HDDs in the sleep mode, which are coupled to the expander, to transition to the active mode. As a result, as illustrated in FIG. 13, the HDDs 323 and 324 coupled to the expander 310 are caused to transition to the active mode. However, the HDDs 421 to 423 coupled to the expander 410, the HDDs 521, 522, and 524 coupled to the expander 510, the HDDs 621 to 624 coupled to the expander 610 are maintained in the sleep mode.

Figure 14:
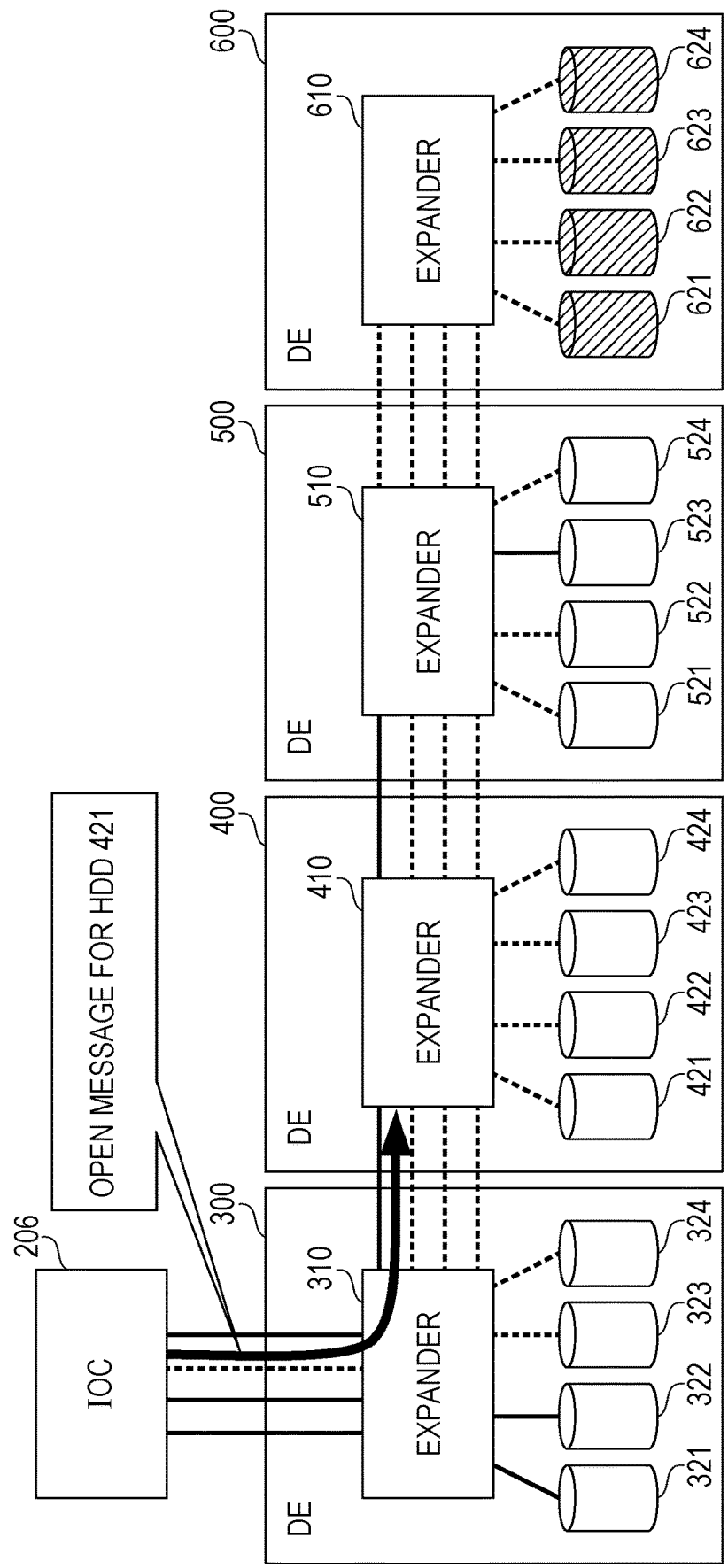
FIG. 14 is a second specific example of the power saving control processing in the third embodiment.

FIG. 14 is a second specific example of the power saving control processing in the third embodiment. In FIG. 14, it is assumed that an OPEN message used to request a connection establishment is transmitted to the HDD 421 in the DE 400 from the IOC 206 after the state in FIG. 13.

When each of the expanders 310, 410, and 510 according to the third embodiment receives the OPEN message that has been transmitted from the IOC 206, the expander transmits, to a subsequent expander, a reception notification used to notify the subsequent expander of reception of the OPEN message. In the embodiment, for example, the subsequent expander is notified of the reception of the OPEN message by "OPEN_RCV" which is a primitive. When each of the expanders 410, 510, and 610 that are at the second and subsequent expanders receives the reception notification of the OPEN message, the expander causes the HDDs in the sleep mode among the HDDs coupled to the expander to transition to the active mode.

In the example of FIG. 14, when the expander 310 receives an OPEN message for the HDD 421 from the IOC 206, the expander 310 transmits, to the expander 410, the reception notification of the OPEN message. When the expander 410 receives the reception notification of the OPEN message, the expander 410 causes the HDDs 421 to 423 to transition the active mode.

Here, it takes time to some extent until the expander 410 obtains a destination of the received OPEN message and transfers the received OPEN message to a port corresponding to the destination. Therefore, in the embodiment, when the expander 310 receives an OPEN message, the expander 310 transmits a reception notification of the OPEN message to the subsequent expander 410 before the OPEN message is transferred to the port corresponding to the destination. As a result, the expander 410 may cause the HDD 421 to transition to the active mode before receiving the OPEN message for the HDD 421 from the expander 310.

As described above, an expander causes the HDDs in the sleep mode, which are coupled to the expander, to transition to the active mode not at a time point at which the number of established connections has become smaller than the maximum number of routes but at a time at which it is detected that a previous expander has received an OPEN message after the number of established connections had become smaller than the maximum number of routes. As a result, as compared with the second embodiment, a time period in which the HDDs are maintained in the sleep mode increases. Thus, in the third embodiment, the power consumption of the storage system may be reduced as compared with the second embodiment while the access performance similar to that of the second embodiment is realized.

In the example of FIG. 14, when the expander 410 receives the OPEN message from the expander 310, the expander 410 further transmits a reception notification of the OPEN message to the subsequent expander 510. When the expander 510 receives the reception notification of the OPEN message, as illustrated in FIG. 14, the expander 510 causes the HDDs 521, 522, and 524 to transition to the active mode. However, an OPEN message is not transmitted from the expander 410 to the expander 510, such that the expander 510 does not transmits a reception notification of the OPEN message to the subsequent expander 610. Therefore, the HDDs 621 to 624 coupled to the expander 610 are maintained in the sleep mode. As described above, in the third embodiment, as compared with the second embodiment, as the stage of the expander is later, a time period in which the HDDs coupled to the expander are maintained in the sleep mode may increase.

Processing of the storage system according to the third embodiment is described below with reference to flowcharts.

Figure 15:
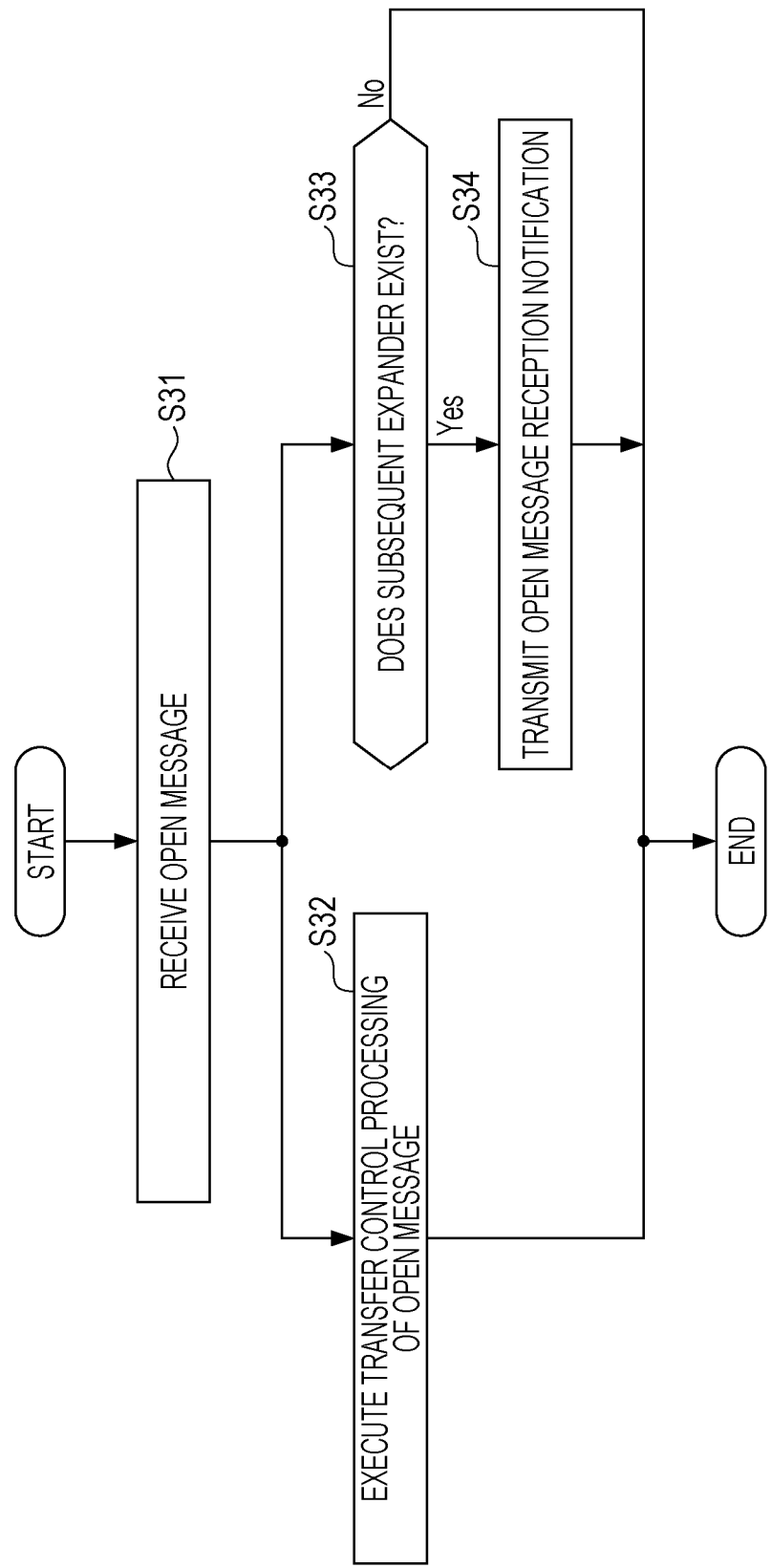
FIG. 15 is a flowchart illustrating an example of OPEN message reception processing.

FIG. 15 is a flowchart illustrating an example of OPEN message reception processing. The processing of FIG. 15 is executed by each of the expanders 310, 410, 510, and 610. The processing illustrated in FIG. 15 is described below with reference to step numbers.

(S31) The control unit of the expander receives an OPEN message. The control unit executes processing of Step S32 and processing of Step S33 in parallel.

(S32) The control unit executes transfer control processing of the OPEN message. For example, the control unit obtains a HDD that is a destination from the received OPEN message and identifies a port used to transfer the OPEN message. The control unit controls the switch such that the OPEN message is transferred to the identified port. As a result, the OPEN message is transferred via a communication route corresponding to the destination. The HDD that is the destination may be a HDD coupled to the expander including the control unit or a HDD coupled to a subsequent expander.

(S33) The control unit determines whether a subsequent expander exists. When a subsequent expander exists, the control unit causes the processing to proceed to Step S34. When a subsequent expander does not exist, the control unit ends the processing.

(S34) The control unit 312 transmits an OPEN message reception notification to the subsequent expander by using an OPEN_RCV primitive. After that, the control unit ends the processing. The transmission of the reception notification in Step S34 is executed before the processing of Step S32 is completed.

In addition, in the third embodiment, the first expander 310 also executes the processing of FIG. 8 in addition to the processing of FIG. 15. However, each of the expanders 410, 510, 610 that are the second and subsequent expanders executes the subsequent processing of FIGS. 16 and 17, instead of the processing illustrated in FIG. 9.

Figure 16:
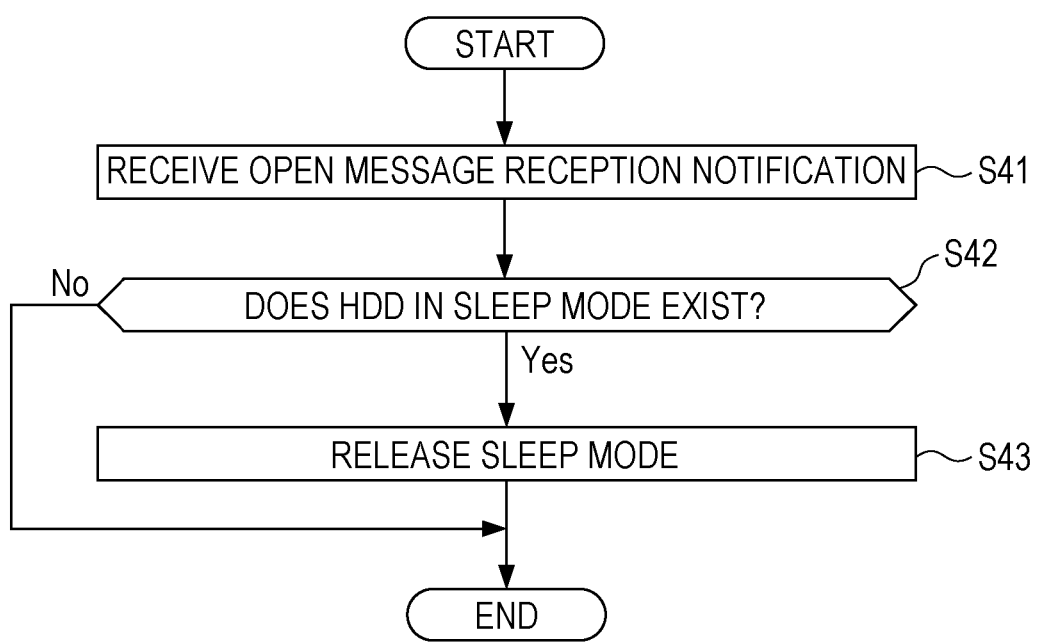
FIG. 16 is a flowchart illustrating an example of sleep mode release control processing.

FIG. 16 is a flowchart illustrating an example of sleep mode release control processing. The processing of FIG. 16 is executed by each of the expanders 410, 510, and 610. The processing illustrated in FIG. 16 is described with reference to step numbers.

(S41) The control unit of the expander receives an OPEN message reception notification from a previous expander.

(S42) The control unit determines whether a HDD in the sleep mode exists in the DE including the control unit. When a HDD in the sleep mode exists in the DE, the control unit causes the processing to proceed to Step S43. When a HDD in the sleep mode does not exist in the DE, the control unit ends the processing.

(S43) The control unit causes the HDD in the sleep mode among the HDDs coupled to the expander including the control unit to be released from the sleep mode.

FIG. 17 is a flowchart illustrating an example of sleep mode transition control processing. The processing of FIG. 17 is executed by each of the expanders 410, 510, and 610. The processing illustrated in FIG. 17 is described below with reference to step numbers.

(S51) The control unit of the expander receives a notification indicating an increase or a decrease in the number of connections from a previous expander. That is, the control unit receives a BROADCAST (+) primitive or a BROADCAST (−) primitive.

When the control unit has received a BROADCAST (+) primitive, the control unit adds "1" to the number of connections of the management table 800 stored in the storage unit of the expander including the control unit. In addition, when the control unit has received a BROADCAST (−) primitive, the control unit subtracts "1" from the number of connections of the management table 800.

(S52) The control unit determines whether a subsequent expander exists. When a subsequent expander exists, the control unit causes the processing to proceed to Step S53. When a subsequent expander does not exist, the control unit causes the processing to proceed to Step S54.

(S53) The control unit transfers the notification indicating an increase or a decrease in the number of connections, which has been received in Step S51, to the subsequent expander.

(S54) The control unit determines whether the notification that has been received in Step S51 indicates an increase in the number of connections. When the notification indicates an increase in the number of connections, the control unit causes the processing to proceed to Step S55. When the notification indicates a decrease in the number of connections, the control unit ends the processing.

(S55) The control unit determines whether the number of connections is the same as the maximum number of routes, with reference to the management table 800 stored in the storage unit of the expander including the control unit. When the number of connections is the same as the maximum number of routes, the control unit causes the processing to proceed to Step S56. When the number of connections is smaller than the maximum number of routes, the control unit ends the processing.

(S56) The control unit causes all HDDs other than a HDD in which a connection has been established among the HDDs coupled to the expander including the control unit to transition to the sleep mode. In addition, the control unit ends the processing.

The information processing in the first embodiment may be realized, for example, when a processor installed in the connection controller 22 is caused to execute a program. The information processing in the second and third embodiments may be realized, for example, when the control unit of each of the expanders 310, 410, 510, and 610 is caused to execute a program.

These programs may be recorded in a computer-readable recording medium. Examples of the computer-readable recording medium include a magnetic storage device, an optical disk, a magneto-optical recording medium, and a semiconductor memory. Examples of the magnetic storage device include a hard disk device (HDD), a flexible disk (FD), and a magnetic tape. Examples of the optical disk include a digital versatile disc (DVD), a DVD-RAM, a compact disc-read only memory (CD-ROM), and a compact disc recordable (CD-R)/compact disc rewritable (CD-RW). Examples of the magneto-optical recording medium include a magneto-optical (MO) disk.

When a program is to be distributed, for example, a portable recording medium in which the program is recorded such as a DVD, a CD-ROM, or the like is sold. In addition, the program may also be stored in a storage device of a server computer and transferred from the server computer to another computer via a network.

For example, a computer that is to execute a program stores, in a storage device of the computer, a program recorded in a portable recording medium or a program transferred from a server computer. In addition, the computer reads the program from the storage device of the computer and executes processing corresponding to the program. The computer may also directly read a program from the portable recording medium and executes processing corresponding to the program. In addition, the computer may also execute processing corresponding to a received program each time the program is transferred from the server computer coupled via a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
   a controller configured to access two or more first storage devices; and
   a first storage apparatus including:
      two or more second storage devices among the two or more first storage devices; and
      a first connection controller coupled to the controller via two or more first communication routes and including:
         a first switch circuit configured to relay the communications between the controller and the two or more first storage devices;
         a memory; and
         a processor coupled to the memory and configured to;
            determine a second number indicating a number of the first storage devices in each of which a connection with the controller is established among the first storage devices and
            perform control such that the second storage devices, in each of which a connection with the controller is not established, are caused to transition to a power saving state in a time period in which the second number reaches a first number indicating a number of the first communication routes.

2. The storage system according to claim 1, further comprising:
   a second storage apparatus including:
   two or more third storage devices other than the second storage devices among the first storage devices; and
   a second connection controller coupled to the controller via the first connection controller and including:
      a second switch circuit configured to relay the communications between the controller and the one or more first storage devices other than the second storage devices;
      a second memory; and
      a second processor coupled to the memory and configured to;
         determine the second number; and
         perform control such that the third storage devices, in each of which a connection with the controller is not established, are caused to transition to a power saving state in a time period in which the second number reaches the first number.

3. The storage system according to claim 2,
   wherein the first processor is further configured to:
      determine the second number by monitoring a connection establishment request transmitted from the controller; and
      transmit notification information relating to the second number to the second processor,
   and wherein the second processor is further configured to:
      determine the second number based on the notification information.

4. The storage system according to claim 1,
   wherein the first processor is further configured to:
      release the second storage devices, having been caused to the power saving state, from the power save state in case the second number becomes less than the first number.

5. The storage system according to claim 2,
   wherein the first processor is further configured to transmit, when a connection establishment request from the controller is received, a reception notification to the second processor before determining a destination of the connection establishment request; and
   wherein the second processor is further configured to release the third storage devices having been caused to the power saving state from the power save state, when the reception notification is received.

6. A connection controller comprising:
   a switch circuit that relays communications between a controller and at least two or more second storage devices among two or more first storage devices to be accessed from the controller; and
   a control circuit including:
   a memory; and
   a processor coupled to the memory and configured to:
   determine a second number indicating a number of first storage devices in each of which a connection with the controller is established among the two or more first storage devices; and
   performs control such that the second storage devices, in each of which a connection with the controller is not established among the two or more second storage devices, are caused to transition to a power saving state in a time period in which the second number reaches a first number indicating a number of communication routes used when the controller accesses the two or more first storage devices.

7. The connection controller according to claim 6, in case where the switch circuit is directly coupled to the controller, the processor is configured to determine the second number by monitoring a connection establishment request transmitted from the controller.

8. The connection controller according to claim 6, in case where the switch circuit is coupled to the controller via another switch circuit of another connection controller, the processor is configured to determine the second number based on notification information transmitted from the another connection controller.

9. The connection controller according to claim 6, wherein the processor is further configured to:
   release the second storage devices, having been caused to the power saving state, from the power save state in case the second number becomes less than the first number.

10. The connection controller according to claim 6, in case where the switch circuit is coupled to the controller via another switch circuit of another connection controller, the processor is configured to release the second storage devices, having been caused to the power saving state, from the power save state in case a reception notification, indicating that a connection establishment request from the controller is received by the another connection controller, is received from the another connection controller.

11. A non-transitory computer-readable storage medium storing a storage control program for causing a computer to perform a process comprising;
    determining a second number indicating a number of first storage devices in each of which a connection with a controller is established among the two or more first storage devices; and
    performing control such that a second storage devices, in each of which a connection with the controller is not established among the two or more first storage devices, are caused to transition to a power saving state in a time period in which the second number reaches a first number indicating a number of communication routes used when the controller accesses the two or more first storage devices.

\* \* \* \* \*